2,885,277

HYDROGEN GAS GENERATING PROPELLENT COMPOSITIONS

John A. Fitzpatrick, Washington, D.C., assignor to Airtronics Inc., a corporation of Maryland No Drawing. Application November 25, 1953
Serial No. 394,481

3 Claims. (Cl. 52—.5)

This invention pertains to compositions useful as pyrotechnics and for generating hydrogen gas in a form suitable for propelling missiles.

Broadly stated, the invention is concerned with the use of certain unique exothermic reactions involving the oxidation of magnesium, or other reducing element as hereinafter described, with liberation of hydrogen. These reactions differ from conventional reactions for oxidizing magnesium and the like since no nitrates, chlorates, perchlorates, or other typical oxygen donors are used. Instead, water in vapor phase liberated or formed in situ from certain compounds is used to effect the desired oxidation.

According to the invention, water for oxidation of the element is obtained in either of two ways, i.e., from salts containing water of crystallization or from compounds which will decompose when heated to form water. Thus, one feature of the invention involves forming a mixture of a salt containing water of crystallization and a reducing element such as magnesium, aluminum, lithium, sodium or any other element above hydrogen in the electromotive series, and then igniting such mixture. Hydrogen, suitable as a propellant, is generated by the resulting exothermic reaction. Additionally, since the reactions are intensely luminous, particularly when magnesium is used, the mixtures are especially suitable for pyrotechnic uses, such as flares and signal lights.

Salts containing water of crystallization suitable for use are: $MgSO_4.7H_2O$, $Na_2CO_3.10H_2O$, $NaHPO_4.12H_2O$, $Na_2B_4O_7.10H_2O$ and $Al_2(SO_4)_3(NH_4)_2SO_4.24H_2O$ and all other salts containing water of crystallization which can be liberated by ignition of the mixture.

Generally, the salt or salts used are selected after consideration of the following: (a) available heat energy, (b) thermal stability, (c) ambient moisture stability, (d) chemical activity, (e) toxicity of reaction by-products, (f) decomposition hazards, (g) ignition hazards, (h) burning rate, and (i) cost.

The cost of composition components is normally secondary to the useful storage life, the fire and explosion hazard, and the toxicity hazard (before and after reaction takes place).

When compared with the normal pyrotechnic composition consisting of sodium nitrate and magnesium, the present products are substantially superior.

One of the preferred salts for use, according to the invention, is $MgSO_4.7H_2O$ (epsom salts). The latter material is cheap, non-toxic, and entirely safe from the explosion or fire viewpoint. It is not deliquescent and normally loses no water until approximately 50° C. At this temperature it loses one of its water molecules or approximately 15% of its total water. At approximately 80° C. it loses three more of its water molecules to become the trihydrated form. It remains stable at the trihydrate form until 200° C. Thus over the usual temperature range of military specifications, the salt is at least a trihydrate. This high temperature efflouresence is not too serious because experience has shown that compositions which contain magnesium in proportions ranging from stoichiometric to twice stoichiometric are very acceptable performers. The reaction products contain sulfur dioxide as the only dangerous material and experience has shown that the amount present is not sufficient to be noticeable, even in close confined quarters, where large quantities of composition have been reacted. The light from the reaction is intensely white. It possesses a vigorous unconfined burning rate.

Another highly advantageous salt containing water of crystallization is $Na_2B_4O_7.10H_2O$ (borax). This compound loses eight of its water molecules at 75° C. and becomes anhydrous at 200° C. Thus it is useful if kept below about 70° C. It reacts with an intensely yellow light and exhibits an unconfined burning rate which is somewhat slower than that of epsom salts. The presence of boron compounds renders the smoke hazardous if breathed in quantity. The possible presence of the oxides of sodium are also a hazard if the composition is to be burned in confined quarters.

As the reducing element, magnesium and magnesium-aluminum alloys are preferred, although there can be used any element above hydrogen in the electromotive series, i.e., any element where oxide has a heat of formation greater than hydrogen oxide. This includes, among others lithium, sodium, potassium, rebidium, cesium, beryllium, calcium, strontium, barium, boron, aluminum and titanium. In those cases where the element is extremely active and reacts with surrounding air or water vapor, as in the case of sodium or lithium, it may be desirable to use the same in protected form, i.e., immersed in kerosene, as understood in the art. These elements may be in any convenient form, e.g., granular or powdered.

The relative amounts of the salts and reducing elements can be widely varied, dependent, for example, on the nature of the pyrotechnics display or other use for the mixture. However, as noted above, compositions which contain the magnesium or other element in proportions varying from stoichiometric to twice stoichiometric are desirable. Satisfactory result scan also be obtained using less than the stoichiometric amount of elements.

The following is a typical illustration of the above mentioned embodiment of the present invention wherein parts referred to are by weight:

Seven parts powdered magnesium and ten parts $MgSO_4.7H_2O$ crystals were mixed together and placed within an appropriate container, e.g., a cardboard tube. The mixture was then ignited through a conventional black powder fuse. The mixture burned with a brilliant white light suitable for pyrotechnics such as flares or other signals. Where it is desired to have the illumination accompanied by a loud noise, the mixture should be confined.

The exact mechanism of the reaction or reactions involved when mixtures of the type described above are ignited, is not fully understood. However, it is believed that ignition effects a breakdown of a part of the salt with liberation of water, which in turn reacts with some of the reducing element to give hydrogen gas and the oxide of the reducing element. Once ignited, the reaction is self-perpetuating since it is exothermic and the heat thus generated breaks down more salt with the formation of additional water vapor for reaction with the reducing element. When the oxide of the reducing element is a solid, as in the case of magnesium, the hydrogen gas is not substantially contaminated with other reaction products. In this case the hydrogen gas given off is highly desirable for use as a propellant.

As indicated above, one of the unique features of the use of mixtures of the type described above for pyrotechnic purposes is that nitrates and similar oxidizing agents are effectively eliminated. Moreover, the present mixtures are substantially safer, due to a higher ignition point, than conventional pyrotechnics such as flares, fireworks, display signal lights, incendiary devices and the like.

As indicated above, the invention also contemplates the use of compounds which, upon being heated, decompose to form water. Accordingly, another feature of the invention involves igniting a mixture of magnesium or other reducing element of the type referred to above and a water-forming compound for use as a pyrotechnic material. Such mixtures can also be utilized for the purpose of propelling various types of projectiles such as missiles since, upon ignition, hydrogen is generated thereby as in the case where salts containing water of crystallization are used.

The manner in which the water-forming compound functions to give the desired result apparently corresponds with that of the salt containing water of crystallization. That is, upon igniting the mixtures, water is formed or made available and reacts with the reducing element under exothermic conditions liberating hydrogen as well as giving off a luminous light.

As typical water-forming compounds suitable for use according to the invention, there may be mentioned ammonium nitrate, boracic acid, hydrated lime (calcium hydroxide), tartaric acid, sulfamic acid, anhydrous calcium citrate, sucrose or any other compound which will form water on being heated.

Of the above mentioned water-formers, ammonium nitrate is preferred, particularly when admixed with magnesium. However, excellent pyrotechnics can also be obtained by using ortho boracic acid. This material is stable up to 185° C. at which point it decomposes to form water and boric anhydride. The flame color of this material is an intense light green. The only hazard in the reaction products is the boron compound. Its unconfined burning rate is the same as the borax reaction while a more rapid rate has been observed with sulfamic acid.

As indicated above, hydrated lime (calcium hydroxide) also forms water upon heating and will react with magnesium. This reaction produces an intense light of a light red color. The solid reaction products are somewhat hazardous because they contain quicklime, CaO. Considerable ammonia results from the reaction if carried out in air, but not in a sufficient quantity to be considered a hazard. The burning rate for an unconfined stoichiometric mixture is slow. This is because of the low heat of reaction. With this water-former, excess magnesium is not recommended because of the tamping effect of the solid calcium oxide residue.

One of the most energetic reactions investigated is a combination of a water-forming and a water of crystallization reaction utilizing, for example, barium hydroxide, monohydrated. The use of this reaction, however, is rather limited since the barium salt is poisonous, extremely caustic, and deliquescent. It is, however, advantageous to some degree because of the extremely large available heat per gram of reactant.

The amount of water-forming compound and reducing element used for the purposes of the invention can be varied, but generally stoichiometric amounts are used. This is not limiting, however, since for flares and like uses, excess element amounting to twice the stoichiometric amount and even more can be used to advantage.

The use of water-forming compounds as described above is further illustrated by the following example: A stoichiometric mixture of powdered magnesium and ammonium nitrate (i.e., 73 parts by weight magnesium and 80 parts by weight of the nitrate) was prepared by uniformly mixing the two ingredients together. The resulting mixture was fired from a standard Springfield 30-06 rifle. The gases thus generated possessed low molecular weight and were otherwise suitable as a high velocity propellant.

A third embodiment of the present invention involves the use of the gaseous reaction product obtained by mixing together an aqueous solution of hydrogen peroxide with one of the reducing elements referred to above, the latter being in powdered form and coated with a catalyst.

It has been found that by mixing together an aqueous hydrogen peroxide solution and the powdered reducing element as described above, hydrogen is liberated in a form which is peculiarly adapted for propelling missiles. The desired reaction starts automatically when the materials are mixed without necessitating the use of heat or other igniting means. The materials may be conveniently mixed by causing the rupture of a membrane otherwise separating the coated powdered reducing element from a supply of aqueous hydrogen peroxide.

As the catalyst with which the reducing element is coated, there may be used potassium permanganate, manganese dioxide or any other organic or inorganic catalyst which rapidly decomposes hydrogen peroxide. Apparently, decomposition of the hydrogen peroxide liberates sufficient heat to effect reaction between the reducing material and the water present whereby hydrogen gas is liberated.

As indicated above, the reducing material should be in the granular or powdered form although particle size can be widely varied. Satisfactory results are obtained using mixtures of powders varying in size from 80 mesh to about 4 to 5 microns.

The reducing element can be coated with the catalyst by simply immersing the powder into an aqueous solution of the catalyst and then permitting the powder to dry. Concentrations as low as 1% by weight of organic catalyst can be used for coating the magnesium or other powder.

The aqueous hydrogen peroxide solution used according to the invention can be of varying concentrations. However, it is generally preferred to use concentrations of the order of 30% or higher. Concentrations as low as 15% hydrogen peroxide also give satisfactory results.

The following example provides a specific illustration of the feature described above wherein hydrogen peroxide is used to catalytically initiate a reaction between the water and magnesium for the purpose of generating hydrogen suitable for propellant purposes:

1.35 grams of a mixture of approximately 80 mesh magnesium particles and 10 micron magnesium particles were immersed in an aqueous solution of potassium permanganate. The particles were thereafter removed from the permanganate solution and permitted to dry.

The thus coated magnesium particles were then mixed with 1.50 cc. of 30% aqueous solution of hydrogen peroxide and fired in an experimental gun. Desirable results can also be obtained in the foregoing example if instead of coating both the 80 mesh and 10 micron size magnesium particles, the 80 mesh magnesium is first coated with permanganate and the thus coated metal thereafter admixed with the 10 micron particles, the resulting mixture being then subjected to the action of the peroxide. In other words, it is only necessary to coat the 80 mesh with the catalyst and not the 10 micron size. High pressure hydrogen gas was thereby generated suitable for propelling a projectile, as demonstrated by firing from an experimental type gun.

Where this specification and the appended claims refer to propulsion of missiles, gun-fired projectiles as well as jet-exhaust propelled objects are intended to be covered. Hydrogen gas in pure state is an excellent propellant in either case, since the gas can move very rapidly due to low weight. The hydrogen is non-contaminated, as indicated above, when, as with magnesium, for example, the oxides are solids at all temperatures to be encountered.

It will be appreciated that the hydrogen-generating mixtures referred to above, involving the use of a salt-containing water of crystallization and/or a water-forming salt, can be ignited in any convenient way, e.g., by fuses or suitable primers such as black powder.

It will also be appreciated that various changes may be made in the invention as described herein without in any way deviating from the scope thereof as defined in the appended claims. Therefore, the scope of the invention is to be determined by the appended claims.

What is claimed is:

1. In the method of propelling missiles with a gas, the improvement which comprises propelling the missile with the gaseous reaction product obtained by igniting a mixture consisting essentially of powdered magnesium and $MgSO_4 \cdot 7H_2O$ wherein said magnesium powder is present in an amount between about stoichiometric and twice stoichiometric with respect to said $MgSO_4 \cdot 7H_2O$.

2. A hydrogen generating composition consisting essentially of powdered magnesium and $MgSO_4 \cdot 7H_2O$ wherein said magnesium powder is present in an amount between about stoichiometric and twice stoichiometric with respect to said $MgSO_4 \cdot 7H_2O$.

3. A missile operatively associated with a hydrogen generating charge for propelling said missile, said charge consisting essentially of magnesium powder and $MgSO_4 \cdot 7H_2O$, wherein said magnesium powder is present in an amount between about stoichiometric and twice stoichiometric with respect to said $MgSO_4 \cdot 7H_2O$.

References Cited in the file of this patent

UNITED STATES PATENTS

| | | |
|---|---|---|
| 1,506,323 | O'Neill | Aug. 26, 1924 |
| 2,477,549 | Van Loenen | July 26, 1949 |
| 2,573,471 | Malina et al. | Oct. 30, 1951 |
| 2,731,342 | Pfefferkorn | Jan. 17, 1956 |